Patented May 14, 1946

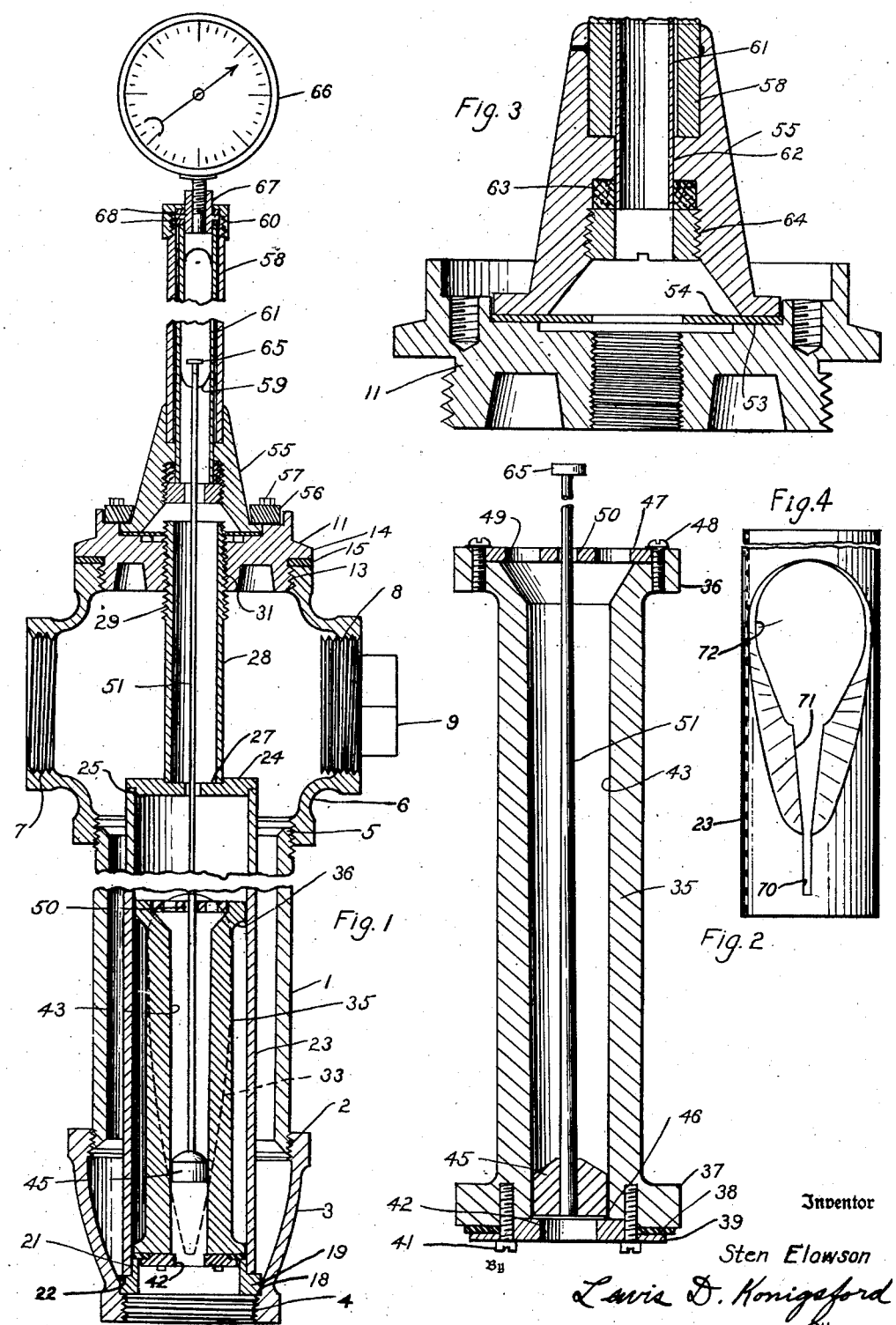

2,400,108

UNITED STATES PATENT OFFICE 2,400,108

WIDE RANGE FLOW METER

Sten Elowson, Brooklyn, N. Y., assignor to Pittsburgh Equitable Meter Company, Pittsburgh, Pa., a corporation of Pennsylvania Application September 4, 1942, Serial No. 457,307

12 Claims. (Cl. 73—208)

This invention relates to apparatus for measuring the rate of flow of fluids.

It is an object of this invention to provide a flow meter for measuring a relatively wide range of flows.

Another object is the provision of a flow meter of simple and compact construction and of relatively low manufacturing cost which will accurately measure a relatively wide range of flows.

Another object is the provision of a flow meter calibrated for measuring a relatively wide range of flows wherein the calibration of both low rates of flow and high rates of flow are spaced so as to be easily readable.

In accordance with the present invention I provide a flow measuring apparatus having an area type flow measuring apparatus for measuring relatively high rates of flow and an area type flow measuring apparatus for measuring relatively low rates of flow, the two measuring apparatus being connected so that when the flow to be measured is greater than the capacity of the low rates of flow measuring apparatus, the measurement will be made by the apparatus for measuring high rates of flow, a common indicator preferably being employed. I prefer to embody my invention in a single exterior casing employing a single indicating scale and other parts embodying common or dual functions.

The invention will be described in greater detail in connection with the accompanying drawing showing a preferred embodiment of the invention by way of example, and wherein:

Figure 1 is a vertical sectional view of a preferred embodiment of the invention, Figure 2 is a vertical sectional view on an enlarged scale of a part of the measuring apparatus, Figure 3 is a vertical sectional view on an enlarged scale of a detail, and Figure 4 is a side view of a modification shown on a reduced scale.

Referring to the drawing, there is shown a tubular casing 1 which may be in the form of a length of pipe or tube screw threaded at the bottom 2 and connected to a reducing sleeve or fitting 3 which is screw threaded at the inlet opening 4 so that it may be connected into a suitable pipe line. At the upper portion 5 of tube 1, which is screw threaded, a T-fitting 6 is secured having lateral openings 7 and 8, the opening 8 being closed by a suitable pipe plug 9. If desired, a fitting having only one lateral opening may be employed, this fitting having a suitable screw threaded opening whereby it may be connected into a pipe line, or the fitting and tubular casing may be formed as a single piece. A cap member 11 is threaded into the top opening 13 of the fitting 6 and a flange 14 with a gasket 15 forms a fluid tight fit therewith.

Sleeve 3 is machined to provide a shoulder 18 upon which is seated a bushing 19 held in fluid tight relation thereto in any suitable manner, as by solder or the like. Bushing 19 is machined to provide a reduced centering sleeve portion 21 and a shoulder 22 which receives thereon a tube 23 with a tight fit extending through the exterior casing 1 and having at the top a cap or cover 24 with a rabbeted edge portion 25 received within the tube 23. Cover 24 is also bored to provide a seating recess 27 for the end of a tube 28 which is screw threaded at 29 into a screw threaded central bore 31 in cover 11 and by suitable manual rotating of tube 28 to cause it to bear against cap 24, the tube 23 is held in place on shoulder 22 with a substantially fluid tight fit.

Tube 23 has an orifice or slot 33 formed therein which preferably is parabolic in shape and may be formed conveniently by a suitable rotary cutting tool cutting away a portion of the tube on a plane at an angle to the axis of the tube. Although I prefer to employ two diametrically opposite slots 33, only one such slot appears in the drawing. Within tube 23 is located an elongated piston 35 having a middle reduced or relieved portion and flanges 36 and 37 at its ends which provide a close working fit with the bore of tube 23 on the order of several thousandths of an inch clearance on the diameter. Piston 35 at its bottom has a cushioning gasket 38 of soft rubber or similar material held in place between the bottom of flange 37 and gland 39 by screws 41. Gland 39 has a central hole 42 therein which aligns with a tapered bore 43 in piston 35. Bore 43 tapers from the smallest diameter at the bottom to the largest diameter at the top, the taper preferably being on the order of about 45 minutes. A piston 45 is located in bore 43 and in its lowermost position rests on a flange 46 provided by gland 39. Piston 45 has about the same per cent taper on its outside diameter as bore 43 and in its lowermost position provides a clearance with bore 43 on the order of a few thousandths of an inch. At the top of piston 35 is located a cover 47 held on an internal shoulder by screws 48 and providing openings 49 for escape of fluid and a central opening 50 through which extends a rod 51 secured to the piston 45 in any suitable manner, as by a pressed fit. The pistons 35 and 45 may be made of aluminum alloy or other composition materials having different specific gravities.

The weight of the small piston 45 is calculated from the flow formula $$W = V^2/2gh$$

where V is the velocity of the liquid, and $h$ is the pressure or head of liquid in feet.

Cover 11 provides a shoulder 53 (Figure 3) to receive a gasket 54 and a flanged member 55 which seats thereon and is held in place by a clamping ring 56 and cap screws 57. Member 55 has a tube 58 extending therefrom and held therein by a ring of solder or by any other suitable means, the tube being cut away at 59 to provide a sight opening. A cap 60 is suitably secured to the top of tube 58, as by screw threads. A tube 61 of glass or other transparent material extends through a bore 62 in member 55 and is held in place therein by a packing 63 or the like engaging the sides of the tube and pressed into place by a threaded gland or bushing 64. Rod or stem 51 extends through tube 28 into glass tube 61 and has a head 65 which cooperates with graduations on the tube 58 to indicate rate of flow. If desired, a pressure gauge 66 may be secured to the top, this gauge being threaded into a flanged bushing 67 secured by suitable gaskets 68 between the top of cap 60 and the end of glass tube 61.

The operation of the apparatus now will be described. Liquid enters the inlet opening 4, passes through opening 42 and exerts a pressure against piston 45. The fluid tends to escape through the minimum clearance space between bore 43 and piston 45, and passes upward through bore 43 and openings 49, 50 into tube 23 and thence through opening 33 into casing 1 and out the exit bore 7. However, when the rate of flow is greater than can escape through this minimum clearance, the piston 45 is lifted, thus increasing the clearance between the piston 45 and tapered bore 43 until a point of balance is reached between the elevation of the piston and rate of flow through the clearance. By calibrating tube 58 in units of rate of flow the indicator head 65 will show the rate of flow. Pistons 45 and 35 are so designed that a greater rate of flow is required to hold piston 45 in its uppermost position than is required to commence movement of piston 35. Thus, there is a slight overlap, and by suitable selection of weights of pistons 45 and 35 this overlap may be made as small as practicable and preferably is kept at a unit of flow per unit of time. When the rate of flow is higher than can pass through the maximum clearance between the piston 45 and tapered bore 43, the piston 45 will be raised to the top of tube 35 into abutment with cover 47 and will be held in this position, and thereupon piston 35 will be raised to expose the lower portion of slot 33 and allow escape of fluid therethrough into surrounding casing 1. At this flow the upper flange 36 of piston 35 closes off the upper end of slot 33 so that now all fluid escapes from the lower end of slot 33 under flange 37. Thus, a balance between the elevation of piston 35 and the area of opening 33 under piston 35 is maintained, and at the position of maximum flow through bore 43 the piston 45 assumes a fixed position and moves together with piston 35 to further raise rod 51. However, from this point the unit of calibration on tube 61 changes. Thus, piston 45 may indicate flow in units of cubic feet per minute, and piston 35 will indicate flow in units of ten cubic feet per minute. Assuming the maximum flow through bore 43 to be fifteen cubic feet per minute and the maximum flow allowed by piston 35 through slot 33 to be 250 cubic feet per minute, and assuming the range of movement of piston 45 in bore 43 to be equal to the range of movement of piston 35 in tube 23, then the lower half of the scale on tube 58 will indicate a flow up to fifteen cubic feet per minute and the top half of the scale will indicate a flow from fifteen cubic feet per minute to two hundred fifty cubic feet per minute. Thus, in one instrument is combined a flow meter for measuring a wide range of flows and the spacing of the calibrations at the low rates is such as can be easily and accurately read.

In the modification shown in Figure 4, the tube 23 has a narrow slot 70 at its lower end merging with a tapered slot 71 which in turn merges with the parabolic opening 72. This construction may be employed to eliminate the difficulties of machining of the edge of the parabolic slot where it tapers out to a feather edge.

While I have shown the preferred embodiment of the invention a piston movable in a tube with a parabolic slot in the tube to measure the high rates of flow, any other suitable area type of measuring device or mechanism may be employed for this purpose. Also, in place of a piston movable in a tapered bore for measuring low rates of flow, I may employ any other suitable area type of measuring device or mechanism.

What I claim as my invention and desire to secure by United States Letters Patent is:

1. In a flow meter, a tube having a uniform bore and a parabolic slot in the wall thereof, an elongated piston located in said tube and obstructing said bore, said piston having a tapered bore therein, a second piston located in said tapered bore and obstructing flow through said tapered bore, means providing an escape passage for fluid that passes said second piston into said tube, and means limiting movement of said second piston in said tapered bore.

2. In a flow meter, a tube having a uniform bore and an elongated parabolic slot in the wall thereof, an elongated piston located in said tube and obstructing said bore, the upper end of said piston lying below the top of said slot, said piston having a tapered bore therein, a second piston located in said tapered bore and obstructing flow through said tapered bore, means providing an escape passage for fluid that passes said second piston into said tube, and means limiting movement of said second piston in said tapered bore, and an indicator operated by the position of said second piston.

3. In a flow meter, a casing having an inlet and outlet, a tube in said casing having a slot, a movable member in said tube adapted to obstruct flow therethrough and providing a relatively large variable flow therethrough into said slot dependent on the position of said member, said member in its lowermost position closing the lower end of said slot and uncovering the upper end, a second member in said tube adapted to obstruct flow therethrough and providing a relatively small flow therethrough dependent on the position of said second member, means providing a passage for said small flow to said tube whereby it flows through the upper end of the tube through said slot into the outlet, said means being restricted by movement of said second member to its maximum flow position whereby said first movable member is moved by the flow of fluid, and indicating means to indicate the position of said second member.

4. In a flow meter, a casing having an inlet and an outlet, a tube located in said casing having an opening in the wall thereof, a piston located in said tube adapted to obstruct flow therethrough, means providing a stop for the piston to position the lower end thereof over said opening leaving the upper end of the opening unobstructed, there being a bore in said piston, a second piston in said bore, means limiting downward movement of said second piston, a cover for said bore providing for flow of fluid from the upper end of said bore into said tube, and indicating means attached to said second piston.

5. In a flow meter, a casing having an inlet and an outlet, a first cover closing the upper end of said casing, a first tube located in said casing having an opening in the wall thereof, a second cover having an opening therein for said tube, a second tube screw threaded into said first cover and engaging said second cover about said second opening, a sight glass secured to said first cover in alignment with said second tube, and closed at its end, a piston located in said first tube, means providing a stop for the piston to position the lower end thereof over said first-mentioned opening leaving the upper end of the first mentioned opening unobstructed, there being a bore in said piston, a second piston in said bore, means limiting downward movement of said second piston, a cover for said bore providing for flow of fluid from the upper end of said bore into said first tube, and indicating means secured to said second piston extending through said second tube into said sight glass.

6. In a fluid flow meter, a casing having an inlet and fluid escape means, a member in said casing closing said escape means from the inlet when in one position, said member having a flow passage therethrough, escape means in said casing for fluid flowing through said passage, movable means in said passage providing a variable flow through said passage relative to the position of said movable means in the passage, said member being movable by flow of fluid to close off the second mentioned escape means and uncover said first mentioned escape means, and an indicator associated with said movable means.

7. In a fluid flow meter, a casing having an inlet and fluid escape opening, a member in said casing closing said escape opening from the inlet when in one position, said escape opening extending beyond said member, said member having a flow passage therethrough communicating with the extended portion of the escape opening, movable means in said passage providing a variable flow through said passage relative to the position of said movable means in the passage, said member being movable by flow of fluid to close off the extended portion of the escape opening and uncover said first mentioned escape opening, and an indicator associated with said movable means.

8. A wide range flow meter comprising a casing having a fluid inlet and a fluid outlet interconnected by a passage, a member mounted in said casing for displacement in response to relatively low rates of fluid flow, said member being directly opposed to the flow of fluid entering said inlet and being movable in the direction of fluid flow, a second member independently mounted in said casing for displacement relative to said casing only in response to rates of fluid flow chiefly higher than those which displace said first member, said second member being opposed to the flow of fluid at said inlet and movable in the direction of fluid flow, and an indicator operably connected to said members for actuation through one range when said first member is displaced and for actuation through a further higher range correlated with said one range when said second member is displaced.

9. A wide range flow meter comprising a casing having inlet and outlet openings, means in said casing defining a passage between said openings, a compound piston assembly movable within said casing and directly opposed to fluid flow through said inlet opening, said piston assembly comprising a first piston element independently movable in the direction of fluid flow in response only to relatively low rates of fluid flow, and a second piston element movable in the direction of fluid flow in response only to relatively higher rates of fluid flow than said low rate, and an indicator operably interconnected to said piston assembly for actuation by movement of said first piston element through one range and for actuation by movement of said second piston element through a higher range correlated with said one range.

10. The wide range flow meter defined in claim 9, said indicator comprising a movable indicator element operably connected to said first piston element, and means connecting said piston elements for movement together only when said first piston element reaches a position corresponding to the upper limit of said one range.

11. In a fluid flow meter having an inlet and an outlet, a plurality of closure members for the inlet of relatively different specific gravities, each directly opposing the inlet pressure and individually movable from normal position in response to relatively different rate ranges of fluid flow, and a common flow rate indicating element operatively connected with and actuated by each of said closure members.

12. In a fluid flow meter having an inlet and an outlet, a plurality of closure members for the inlet constructed and arranged in permanently nested relation, said members being of relatively different specific gravities and individually movable from normal position in response to relatively different rate ranges of fluid flow, and flow rate indicating means operatively connected with and actuated by each of said members.

STEN ELOWSON.